United States Patent

[11] 3,582,900

| [72] | Inventor | Robert N. Goldman |
| --- | --- | --- |
| | | Pacific Palisades, Calif. |
| [21] | Appl. No. | 821,869 |
| [22] | Filed | May 5, 1969 |
| [45] | Patented | June 1, 1971 |
| [73] | Assignee | Telecredit, Inc. |

[54] INFORMATION PROCESSING MACHINE
5 Claims, 3 Drawing Figs.
[52] U.S. Cl. .................................................. 340/172.5,
340/149R
[51] Int. Cl. ...................................................... G06f 3/00
[50] Field of Search .......................................... 340/172.5,
149; 235/157

[56] References Cited
UNITED STATES PATENTS
3,311,887  3/1967  Muroga ........................ 340/172.5
3,405,395  10/1968  Wallin ........................... 340/172.5

*Primary Examiner*—Raulfe B. Zache
*Attorney*—Nilsson, Robbins, Wills & Berliner ABSTRACT: An information processing machine is disclosed, specifically for providing information, e.g. status indications, for a large number of subjects. Electrical signals which are representative of various levels of status are registered in locations of a memory which is divided into two separate blocks. An encoder provides electrical signals that are representative of a subjects identification, e.g. 12 binary-coded decimal digits. Certain digits of the representation are transferred to a first block of the memory which responsively supplies signals that identify a section or group of specific locations in a second block of the memory. Signals from those specific locations are then compared with the signals representative of the remaining digits of the subjects identification. Coincidence in such a comparison is detected to indicate a specific location in the second block of memory, which also registers the subject's status. Means for manifesting the subject's status is incorporated in the system to receive the status signals. Apparatus is also incorporated to alter a subject's status and to record a fresh subject's identification along with signals representative of status.

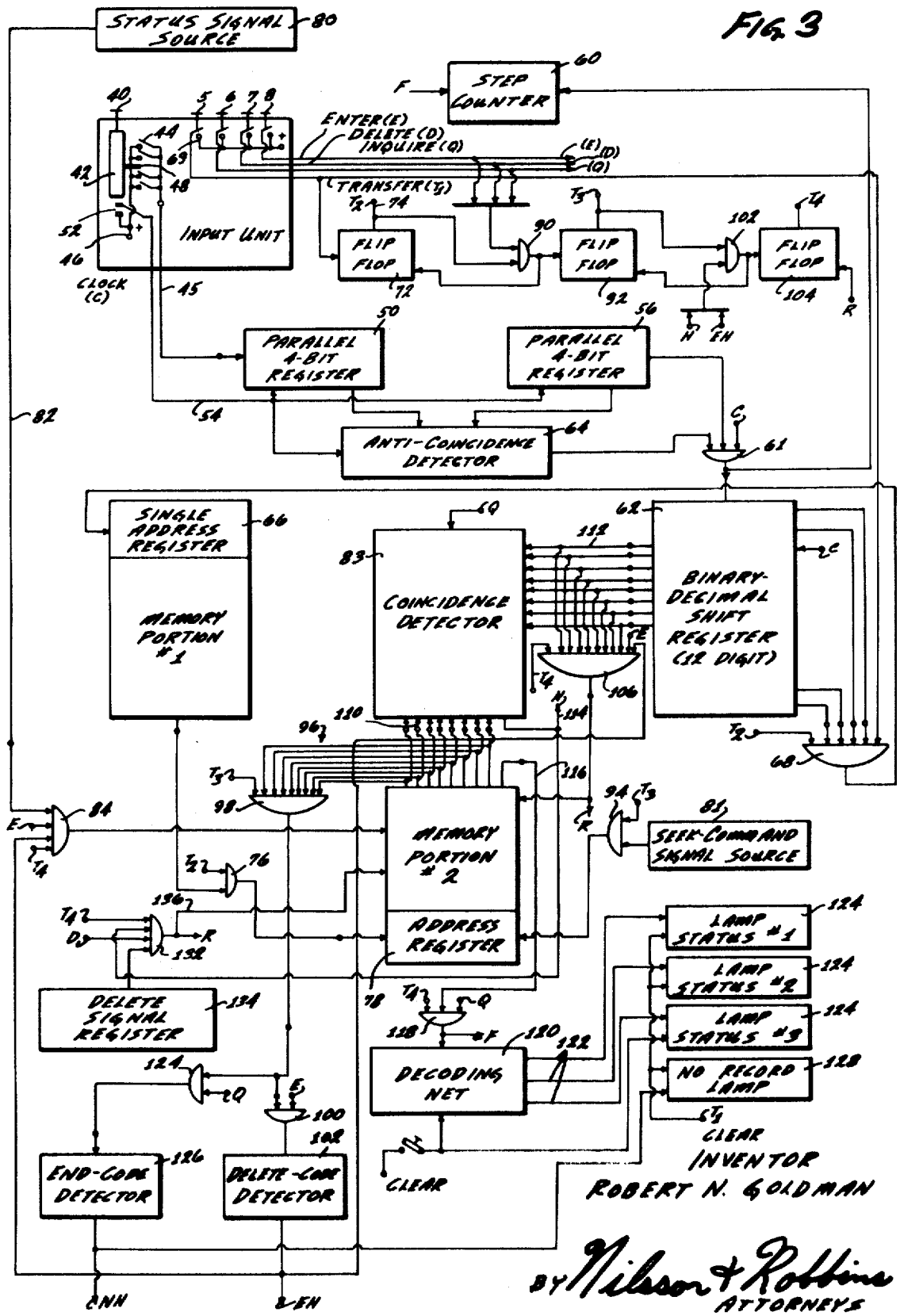

INFORMATION PROCESSING MACHINE

BACKGROUND AND SUMMARY OF THE INVENTION

The need sometimes arises for a machine to economically register a relatively small amount of information regarding each of a large number of separate subjects. For example, in the field of commercial credit, some knowledge of a person's credit history is extremely helpful in determining whether or not the person is currently a good risk for credit. More specifically, with regard to credit data, persons can be assigned to one of a small number of classifications indicative of the risk involved in extending them credit. For example, persons might be classed in accordance with the following levels of status: (1) "a bad credit risk," (2) "a good credit risk up to $500," (3) "a good credit risk up to $1000," (4) "an unlimited, good credit risk," (5) "a history of good credit terminated by a bankruptcy within the past 5 years," and so on. Thus, an effective classification of credit risks may involve a relatively few number of categories, e.g. less than 10.

Other status-indicating or data storage needs may also be met by a machine in which the registered data per individual subject is very limited. However, a principal difficulty previously encountered in implementing such status-indicating systems has been that of providing a machine with adequate storage for the large number of subjects, and incorporating an effective apparatus to promptly gain access to a desired location in such storage. That is, most systems proposed in the past which might have been adaptable for use as a credit-bureau unit would have resulted in a machine of impractical complexity and proportions in such an application. A machine constructed in accordance with the prior art would have required the inclusion of a prodigious memory or storage capacity coupled to a relatively complex and expensive system for selectively obtaining the contents of portions of the memory. Consequently, systems of this type have not come into effective, widespread commercial use.

In general, the system described herein is not only capable of relatively simple and economical forms with large capacity but additionally it identifies subjects in spite of inaccurately or sloppily spelled identification. The system utilizes a comparatively small amount of storage or memory with fast inquiry capability in which the desired information is found in a relatively short period of time by a relatively simple apparatus. Consequently, the system may be economically employed to provide status information at a relatively low cost per inquiry.

BRIEF DESCRIPTION OF THE DRAWINGS

In the drawings, which constitute a part of this specification, exemplary embodiments exhibiting various objectives and features hereof are set forth, specifically:

FIG. 3 is a detailed block diagram of a system as shown in FIG. 1, incorporating the principles of the present invention;

DESCRIPTION OF THE ILLUSTRATIVE EMBODIMENT

Figure 1:
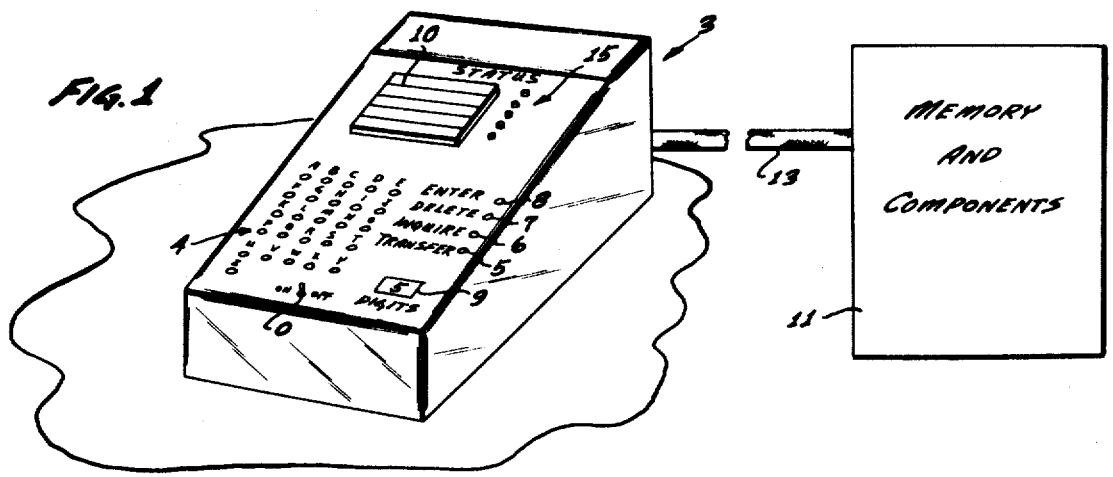
FIG. 1 is a perspective and block diagram of a machine incorporating the principles of the present invention.

Referring initially to FIG. 1, there is shown a desk unit 3 having an array of keys 4 in an alphabetic arrangement. Additionally, the unit includes an "on/off" switch 0 and a group of control buttons specifically identified as a "transfer" button 5; and "inquire" button 6; a "delete" button 7; and an "enter" button 8. The control panel of the unit also incorporates a window 9 in which the number of digits (of an identification) that have been entered in a machine is indicated. Several separate window sections also are defined in a panel 10 each of which manifests a different status situation. For example, each row in the window panel 10 may be backed with a shadow mask stating a particular status, so that illumination of the shadow mask manifests a particular status in the panel 10. Buttons 15 are aligned with the rows of the panel 10 and are used in entering a status.

The desk unit 3 is connected by a cable 13 to the remainder of the machine, represented by a memory-and-components block 11. Of course, the manner in which the machine is constructed physically is subject to wide variations and the arrangement disclosed above is merely exemplary of one form.

Considering the operation of the machine initially in a general way, assume for example, that the credit status is desired for a subject, one "John Thomas Johnathan." The machine operator simply types his name into the machine by means of the alphabetic keys 4. It is to be noted that in the embodiment disclosed herein, vowels which are not the initial letter of a word, along with spaces are eliminated by the operator. Consequently, the letters typed into the machine are: "JHNTHMSJHNTH." The contraction results because 12 digits complete the identification.

In accordance with a preestablished code (table set forth below) the machine translates these alphabetic characters into a series of hexadecimal digits as follows: "4 5 9 13 5 8 12 4 5 9 13 5." It is to be noted, as will be explained in detail below, that the system operates to encode proper identification even though certain spelling errors occur in the person's name or other identification.

With the accomplishment of 12 digits in the machine (as manifest in the window 9) the operator is informed that the machine is loaded. It is to be noted that arbitrary "zero" digits may be employed in the event the identification is not of sufficient length to provide 12 digits. Of course, various specific techniques and procedures may be developed for the format operation, as will be apparent to one skilled in the art.

When the requisite 12 digits have been accomplished within the machine as a complete identification, the operator next depresses the button 5 commanding the transfer of the 12 digits into an operating location within the machine. The operator then may perform one of three distinct functions. Specifically, the operator may either: command an "inquiry" on the identified subject; "enter" the subject for future inquiries; or "delete" the subject's identification from the machine. The selected operation is commanded by selective depression of one of the buttons 6, 7 or 8. In the event the subject's identification is to be "entered" into the memory of the system, the operator depresses the button 8 along with one of the buttons 15 which are aligned with panel 10 to indicate particular levels of status. Thus, the person's identifications and status are entered into the machine for future reference.

The depression of the "delete" button 7 simply removes the subject's identification from the system so that future inquiries upon such a subject will reveal nothing. As disclosed in detail below, the machine indicates no record on a subject by selective illumination of the panel 10.

In making an "inquiry" on the subject the button 6 is depressed whereupon the subject's identification is searched out and if a status exists, it is manifest by the select illumination of one of the rows in the panel 10. Thus, the machine is readily adaptable for use in a credit bureau or other business establishment in which the status of a large variety of subjects is important and a record or status for each is available.

Figure 2:
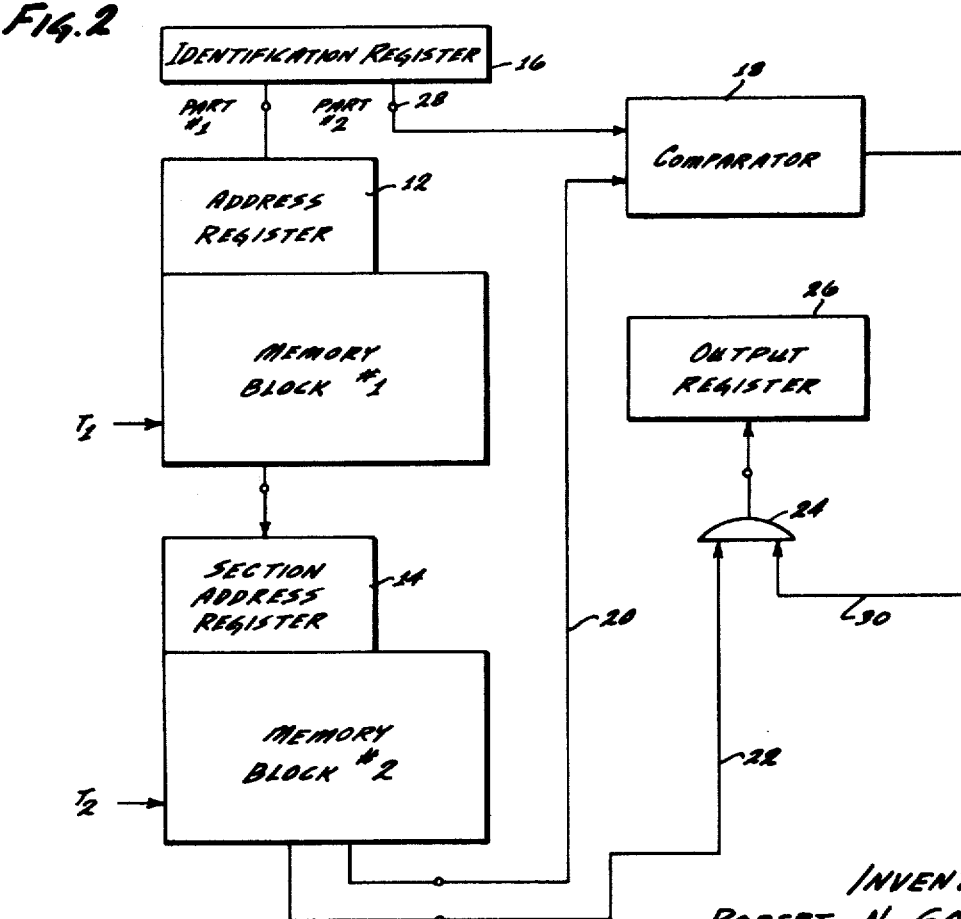
FIG. 2 is a simplified block diagram of a system incorporating the principles of the present invention.

Referring now to FIG. 2, the general operating philosophy of the machine is depicted in simplified form. Specifically, two separate blocks are shown (designated as block 1 and block 2) representing a memory structure. In an implementation of the machine, this memory may be unified or separate and may comprise various different forms of memory structures. One effective apparatus for use as the memory comprises a dynamic, magnetic recording system employing tapes or discs coupled to a static magnetic memory.

The memory blocks 1 and 2 are provided with addressing structures as generally well known in the prior art. Specifically, an address register 12 is incorporated with the memory block 1 so that the memory block delivers the signals registered in the specific location that is identified by the contents of the address register 12. Similarly a section address register 14 is incorporated to operate with the memory block 2; however, the section address register 14 identifies a section within memory block 2 (including a plurality of individual storage locations). The signals registered in those storage locations (pertinent to individual subjects) are thus designated and provided in sequence from the memory block 2.

Considering the general operation illustrated by the system of FIG. 2, in view of the above preliminary description, assume that it is desired to obtain certain specific information that is registered in the machine, e.g. the credit status of a subject identified by name. Initially, the subject's name is reduced to digital signals in an identification register 16 as generally explained above. The identification register 16 might comprise binary-coded alpha-numeric stages (hexadecimal) as well known in the prior art.

The register 16 is coupled to the address register 12 and to a comparator or coincidence detector 18. More specifically, for example, four stages of the register 16 might be connected to the address register 12 while another eight stages are connected to a binary coincidence detector 18 as generally well known in the prior art. Thus, one portion of the identification signals are supplied to the address register 12 while the others are supplied to the comparator 18. To consider a specific illustrative example, assume that the register 16 contains signal representations for numbers: "4 5 9 13 5 8 12 4 5 9 13 5" as considered above. The first two digits and the last two digits form a combination of signals representing "4 5 13 and 5," which are transferred to the address register 12 while signals representative of the remainder of the identification are applied to the comparator 18.

The memory block 1 is active to receive the applied numerical signals during the first phase of the operation which is designated by a timing signal $T_1$ (source not shown). The operation of the memory block 2 is subsequent and coincides to the period of a subsequent timing signal $T_2$ (source not shown). As indicated, the memory block 1 contains a specific location for each possible set of four-digit decimal numerals. Consequently, when the signals representing the digits "4 5 13 and 5" are registered in the address register 12 (during the interval of signal $T_1$) the block 1 provides signals designating a plural-location section address in the memory block 2. The number of numerical stages represented by such a section address may be considerable, as for example three bytes, and the signals are placed in the register 14.

The receipt of section-address signals in the register 14 causes the memory block 12 to provide a sequence of sets of signals that are representative of the contents of each of the individual locations within the identified section. In the selected example, each group of signals (representative of the contents of a specific location) from the memory block 2 comprises nine decimal digits. The eight least significant of those digits are represented by signals which are supplied through a cable 20 to the comparator 18. The remaining (most significant) digit indicates a status which is represented by signals that are supplied through a cable 22 to an AND gate 24 the output of which is supplied to a register 26. The AND gate 24 comprises a gang or compound gate wherein the receipt of a qualifying binary signal in the conductor 30 enables the passage of the decimal-binary status signals carried in the cable 22 through the gate 24 to the output register 26. Again, in the example under consideration, the signals in the cable 22 may indicate a subject's status by a decimal digit (binary coded).

Pursuing a consideration of the operation of the system, as each set of signals is supplied in sequence to the comparator 18, through the cable 20. Signals representative of a similar number of digits are supplied from the identification register 16 through the cable 28 to the comparator 18. Pursuing the above specific example, signals representative of the numerals "9 13 5 8 12 4 5 and 9" (eight central characters of the identification) are supplied from the register 16 to the comparator 18 through the cable. Concurrently sets of eight binary-coded decimal characters are presented in sequence by signals from the block 2. The comparator 18 thus seeks an identity between the two sets of received signals. If a coincidence is detected by the comparator 18, a single high-state binary signal is supplied through the conductor 30 qualifying the gate 24 to pass the status-indicating signals carried in the cable 22 which are registered with the coincident signals in the block 20 (in the same location). Those signals are received in the output register 26 by which the status of the selected subject is manifest.

In reviewing the operation of the system as generally described with reference to FIG. 2, it may be seen that by utilizing apparatus to register the identification signals in the memory block 2, (whereby the memory block 1 provides signals to designate a section containing such signals) a vast number of indications for specific subjects can be economically stored and promptly obtained. Reviewing, the locations of the memory block 2 each contain eight digits which are compared with eight digits from the memory block 1, in seeking a coincidence to identify the desired location in the memory block 2. The locations in the block 2 also register a ninth digit that indicates the identified subject's status.

Of course, the machine hereof (as described in greater detail below) incorporates means for: altering the status of the subject, deleting a subject from the memory block 2 and entering signals representative of a fresh subject (with status) all in the block 2. In the application of the machine as indicated above for a credit bureau, it may be seen that identifying a subject to the machine (as by the subject's name) actuates the machine to promptly produce information revealing the subject's status creditwise. Of course, the speed with which such information is provided depends upon the detailed structure of the system components. However, the basic machine organization as disclosed herein affords a substantial improvement in that regard over conventional machines of the prior art.

Considering the system hereof in greater detail, reference will now be made to FIG. 3 wherein a detailed block diagram of the total machine is disclosed. The alphabetic keyboard of the machine is not shown in complete detail in FIG. 3, rather a single representative symbolic key 40 is shown which is mechanically coupled to a switchplate 42 that selectively closes certain of a set of four binary-coding switches 44. Each of the alphabetic keys is similarly constructed, however, differently indexed to provide a different set of binary-coded decimal signals in a cable 45. The switches are connected to a source of positive potential that is applied at the terminal 46 for producing binary signals. Index tabs as the tab 48, on the plate 42 selectively close certain of the four switches 44 to provide high state binary signals. The system may employ a conventional form of binary decimal coding so that each of the keys develop representative binary-coded digital signals as in the following chart:

| Character | Digit |
|---|---|
| A (Initial letter of first word only) | 2. |
| B | 1. |
| D | 2. |
| E (Initial letter of first word only) | 3. |
| F | 3. |
| G, J | 4. |
| H | 5. |
| I (Initial letter of first word only) | 5. |
| O, K, C, when not followed by e, i, or y | 6. |
| L | 7. |
| M | 8. |
| N | 9. |
| O (Initial letter of first word only) | 9. |
| P | 10. |
| R | 11. |
| Z, S, C (when followed by e, i, or y) | 12. |
| T | 13. |
| U (Initial letter of first word only) | 10. |
| V | 14. |
| W | 15. |
| X (coded as "KS") | 6 and 12. |
| Y (Initial letter of first word only) | 5. |

In accordance with the chart, the key 40 (indicative of the letter "A") formulates a binary-digital signal representation for the decimal digit "two." As the operator does not encode vowels that are not the first letter of a word, in accordance with the operation described herein, such procedure is reflected in the above chart. Thus, for each key depressed, a binary-coded decimal digit is manifest by binary signals that are supplied through the cable 45 to a four-bit register 50. One satisfactory form for the register 50 is shown and described in U.S. Pat. No. 3,407,388 issued to R. N. Goldman.

In the interest of avoiding errors (resulting from misspelled identification and the like) only certain characters, as indicated above are selectively inserted into the system in accordance with a prescribed set of rules. Specifically, as indicated in the above chart, vowels are inserted only if they constitute the first or initial letter of a word. Also, there is some duplication of character representation to enable compression of the alphabetical code into a hexadecimal scale. Of course, various such techniques as apparent to those skilled in the art may be employed in different embodiments of the present invention.

Each of the coding plates (as the plate 42) are positioned to close a switch 52 at the end of a downward stroke. The switch 52 is connected between the terminal 46 (positive potential) and a conductor 54 which is coupled to the register 50 and to a similar register 56. The signals formed by the switch 52 are in the nature of "clock" signals C which on application to the registers 50 and 56 command the acceptance of character-representing signals. Thus, when the operator depresses a key to actuate an associated switchplate, a character-represented signal is accepted in the register 50. Concurrently the signals previously contained in the highest stage of the register 50 are transferred into the register 56.

The two registers 50 and 56 cooperate to eliminate duplicate characters. For example, repeated letters or characters as "*tt*" which frequently appear in names are reduced to a single character "*t*" to avoid mistakes by misspelling. Thus, the machine eliminates duplicate characters in favor of a single-character representation. In that manner, some characters are not accepted within the machine but are eliminated to reduce errors from misspelling.

Each time a character is accepted within the system (as disclosed in detail below) a signal is supplied to a step counter 60 which indicates the aggregate number of characters that have been accepted, in the machine. In accordance with the operation hereof, the operator does not depress an actuate button ("transfer," "enter," "delete" or "inquire") until the full identification of 12 digits are in the machine. Acceptance of a digit occurs when the character-representing signals are passed from the register 56 through a composite or parallel "and" gate 61 to a binary-decimal shift register 62. The register 62 comprises 12 decimal stages, each of which includes four binary stages as disclosed in the above-referenced patent. Registers of this type also are well known in the prior art, wherein fresh input signals registered in the unit are progressively advanced, to a next (more significant) stage when fresh signals are received.

The presentation of character-representing signals to the register 62 is accomplished upon qualification of the gate 61 during the clock signal C, providing that the contents of the registers 50 and 56 are dissimilar. This comparison is determined by an anticoincidence detector 64 which provides a signal to the gate 61 only when different sets of signals are provided in the registers 50 and 56. Various forms of coincidence detectors include subtraction circuits and are well known in the prior art, forms of which are disclosed in detail in a book entitled "Arithmetic Operations in Digital Computers" by R. K. Richards, published 1955 by D. Van Nostrand Company, Inc.

Recapitulating, during the initial operation, the operator (by selective key depressions) accomplishes signal representations for 12 decimal digits in the register 62. These decimal digits are then manipulated within the machine whereby four digits are utilized to address the memory block or portion while the remaining eight digits are employed to locate (by coincidence) a specific information locations within the memory block or portion by striking comparative identity with the contents of such a location.

The twelve sets of digital signals (representative of a subject's identification) may be utilized in any of three different procedural operations. Specifically, the identification may be freshly entered with a newly assigned status for future reference; the identification may be deleted from the memory; or the identification may be employed to determine the current status of an identified subject. In view of the above preliminary explanation of the system, a complete understanding of the details hereof and the mode of operation may now best be presented by assuming the various operations that are to be accomplished and pursuing a detailed explanation thereof.

Assume initially that it is desired to insert identification for a fresh subject along with a status for the subject in the memory portion 2. As explained above, the identification signals for the subject (in the form of 12 binary-coded decimal digits) are registered in the binary-decimal shift register 62. Concurrently, upon depression of one of the buttons 15, (FIG. 1), signals representative of a predetermined status are provided from a status signal source 80 which may comprise a set of switches for providing a particular binary-coded decimal digit through a cable 82 to an AND gate 84. The status signals may, for example, simply be coded as follows:

0011     Good credit risk up to $5,000
1111     Unlimited good credit risk
0000     Poor credit risk Thus, the status signals are available concurrently with the identification signals provided from the register 62. The transfer of the identification signals into operating locations from the register 62 is commanded by depressing the button 5 to form the transfer signal $T_1$ high, which signal sets flip flop $T_2$ to provide the signal $T_2$ high. Signals representing four of the decimal digits from the register 62 are supplied through cables and a composite or gang AND gate 68 (qualified by the signal $T_2$) to the address register 66 of the memory portion 1. As indicated above, the memory portion 1 provides an index of the memory portion 2 so that the signal supplied to the single address register 66 during the period of signal $T_2$ (from the flip flop 72) arbitrarily results in the production of signals from the memory portion 1 identifying a specific section (including several locations) from the memory portion 2 through a cable and the composite "and" gate 76 to the address register 78. Thus, four digits of the subject's identification serve to address a specific section in the memory portion 2.

In inserting a fresh subject's identification and status the objective is to locate an unused location in the memory portion 2. Specifically, the objective is to locate the first unused location in the sequence in which the memory portion 2 is scanned. However, prior to that interval, the section address is provided from the memory portion 1 to the address register 78 of the memory portion 2. The signals indicative of the address are provided through an AND gate 76 to the address register 78 designating the first location in the section of interest. This transfer occurs during the period of the signal $T_2$. Subsequently when the "search" signal $T_3$ goes high, on depression of the button 8 to set the flip-flop 92 through the gate 90 (resetting the flip-flop 72) and AND gate 94 (right central) is qualified which enables seek-command signals from a source 81 to pass and thereby increment the contents of the address register 78. This seek operation may comprise any one of a variety of operations as by simply scanning a section of magnetic medium. However, various techniques of this type are well known in the prior art and the nature of the signal source 81 depends largely upon the structure of the memory portion 2. Functionally, the signals from the source 81 advance locations of the memory portion 2 to provide sequential outputs therefrom which indicate the contents of the individual locations in the specified section.

In the described system, the searching operation involves seeking a set of code signals from the memory portion 2 that are taken from a specific location which indicates that a

*specific* location is not in use. The contents of individual locations of the memory portion 2 are represented by signals provided in eight cables 96 (each carrying one decimal digit) to a gang "and" gate 98 which is qualified by the signal $T_3$. These signals are passed to another composite "and" gate 100 (qualified by the "enter" signal E) for application to a delete-code detector 102. The delete-code detector may comprise a fixed register containing a predetermined "delete-code" which may comprise an extremely unlikely or impossible subject identification, e.g. "*tttt---*." As indicated above, recurring letters are not employed with the result that such a code would never occur to identify a subject.

On receiving such a predetermined code, the delete-code detector 102 provides a high output signal EH which terminates the interval of the signal $T_3$ thereby indicating that an empty location has been located and the "search" or seek phase is concluded. The signal EH is applied through a connection gate to an AND gate 102 (upper right) which is also qualified by the signal $T_3$ and thereupon resets the flip-flop 92 setting a flip-flop 104. As a result, the signal $T_3$ goes low and a signal $T_4$ becomes high. Functionally, the signal $T_4$ specifies the interval during which information is changed or taken from the memory portion 2.

The high state of the signal $T_4$ qualifies the AND gate 84 (left center) along with the signals EH and E thereby allowing the status signals to pass from the source 80 to the memory portion 2 for recording in the specified location. Additionally, the identification signals (eight digits) are provided from the register 62 (right center) through a similarly qualified AND gate 106 for insertion in the same location with the status signals. As a result, the specified location within the memory portion 2 receives signals indicative of eight digits of the subject's identification along with one digit representing the subject's status.

On the qualification of the gate 106, a plurality of signals are passed, any one of which will develop a timing signal R that is applied to reset the flip-flop 104 thereby terminating the "entry" operation. Thus, the "entry" phase is concluded.

As indicated above, another operation which may be performed involves the determination of a subject's status. Assuming the register 62 contains signals that identify the subject, the indicated status is provided by depressing the "inquire" button 6 which forms the signal Q high. Again, prior to such a time, the gate 68 (right center) is qualified to pass the four address digits of the subject's identification from the register 62 through the gate 68 to the single address register 66 of the memory portion 1.

When the inquiry signal Q becomes high, the flip-flop 92 is set through the gate 90 (upper center) thereby initiating the "-seek" interval during which the system searches for the subject's identification in a section of the memory portion 2 (defined by four digits of the identification) located on coincidence of the other eight digits of the identification. With the system in this seeking mode of operation, the coincidence detector 82 is rendered operative by application of the signal Q. Furthermore, the seek-command signal source 81 is also operative during the period of $T_3$, to pass incrementing or address advancing signals through the gate 94 to the address register 78 of the memory portion 2. The signals from each location in the memory portion 2 (within the specified section) are supplied by cables 110 to the coincidence detector 82 for comparison with sets of eight-digit signals provided through the cables 112 from the register 62.

Upon a coincidence being detected between the signals representing eight digits from the register 62, with signals representing a similar number of digits from the memory portion 2, an output signal H appears in a conductor 114 from the coincidence detector 82. The signal H indicates that the desired location has been found and therefore the status signals contained in that location are to be manifest. The signal H operates in the first instance to terminate the searching interval metered by the signal $T_3$ by qualifying AND gate 102 (upper right) whereby the flip-flop 92 is reset and the flip-flop 104 is set.

Subsequently, with the signal $T_4$ high, the signals representative of the subject's status pass through a cable 116 from the memory portion 2 and AND gate 118 (qualified by signals $T_4$ and Q) to a decoding network 120. The decoding network 120 may comprise any of a variety of well known structures as a diode network for providing one selected output dependent upon the applied code, e.g., signals 0011, 0000, or 1111 of the above table. Specifically, the code signals received by the decoding network indicates a specific status for the subject thereby resulting in one of the output conductors 122 receiving a high signal. The conductors 122 are coupled individually to status binary units incorporating lamps 124 which selectively illuminate the panel 10 (FIG. 1). Thus, the subject's status is manifest by the illumination of one of the windows in the panel 10 for easy observation by the operator informing him of the subject's status.

Of course, there exists a possibility that the subject is not registered within the system. To accommodate such a situation, an indication is recorded in the memory portion 2 at the end of each section of memory. The signal may take the form of a series of letters "V" which is not possible of use as a proper identification. The cables 96 are coupled through the AND gate 98 and an AND gate 124 (qualified by the signal Q) to an end-code detector 126. The detector 126 may take a structural form similar to that of the detector 102; however, the detector 126 is constructed to sense the end-of-a-section code signal, e.g. "*vvvv---*." On detecting such a code word, the detector 126 provides an output signal NH high which energizes a "no record" lamp 128 which is mounted behind the status panel 10 (FIG. 1). Consequently, the operator is afforded either a positive indication of a subject's status or alternatively is afforded an indication that the subject is not registered in the memory. It is to be noted that the binary driven lamps (flip-flop with lamp) are reset at the start of a subsequent cycle by the signal $T_1$.

In addition to entering and inquiring with regard to identified subjects, the system hereof is also capable of deleting the identification of subjects that are carried in the memory. Considering that operation, assume that the operator depresses the "delete" switch button 7 to form the signal D high. The identification signals representative of a particular subject who is to be removed from the record are placed in the register 62 in the manner described above. Similarly, to the operations described above, the four digits employed to address a section of a memory 2 are again passed through the gate 68 to the single address register 66 also. Subsequently, also as described above, upon the formation of the delete signal D in a high state, the specified section of the memory portion 2 is searched, seeking identity with the signals carried on the cables 112 from the register 62. Specifically, the signal $T_3$ qualifies the AND gate 94 to advance the locations of the memory portion 2 which locations provide signals through the cables 110 to the coincidence detector for comparison with the signals received through the cables 112. Upon occurrence of similarity the signal H goes high (provided from the detector 82) thereby qualifying an AND gate 132 (lower left) along with the signal D and the signals $T_4$. The signal H immediately provides the signals $T_4$ high by qualifying the gate 102 to reset the flip-flop 92 and set the flip-flop 104.

Upon qualification of the AND gate 132, as indicated above, the output from a delete signal register 134 is provided through a cable 136 to the memory portion 2. The delete signal as indicated above may comprise simply a series of "T's" which represent no identification and are registered in the identified location so that that location in the future is designated as being available to received another subject's identification and status.

It may therefore be seen, that the system operates to rapidly provide status for a subject of which a vast number may be practically accommodated. By using the first memory means as an address register to indicate sections of a second memory means which contains signals with which coincidence is sought, a system very economical of memory space is provided. It is to be noted, that various practical forms of the system hereof may utilize a core memory for the first storage means and a magnetic tape register for the second memory means. Of course, other forms of memories or registers may also be employed and economically used in the present system.

What I claim is:

1. An information-storage system, as for storing a status for each of a substantial multiplicity of subjects, comprising:

means for providing a plurality of digital signals representative of a subject, including means for dropping indicative immediately recurring characters;

first memory means including an address register, said first memory means for providing address signals from a location therein designated by the contents of said address register;

means for registering one portion of said digital signals representative of a subject, in said address register to obtain indicated address signals from said first memory means;

second memory means including a section register, said second memory means for providing representative digital signals from plural locations in a section therein, designated by the contents of said section register;

means for registering said indicated address signals from said first memory means in said section register to indicate a designated section of said second memory means; and means for seek comparing the contents of locations in said designated section with another portion of said digital signals representative of a subject, whereby to identify a specific location in said designated section.

2. An information-storage system, as for storing a status for each of a substantial multiplicity of subjects, comprising:

means for providing a plurality of digital signals representative of a subject;

means for providing digital signals representative of a status for said subject;

first memory means including an address register, said first memory means for providing address signals from a location therein designated by the contents of said address register;

means for registering one portion of said digital signals representative of a subject, in said address register to obtain indicated address signals from said first memory means;

second memory means including a section register, said second memory means for providing representative digital signals from plural locations in a section therein, designated by the contents of said section register;

means for registering said indicated address signals from said first memory means in said section register to indicate a designated section of said second memory means;

means for registering another portion of said digital signals representative of a subject and said digital signals representative of a status for said subject in said designated section of said second memory means including means to detect locations in a section of said second memory means which do not contain representative digital signals; and means for retrieving said digital signals representative of a status including means for seek comparing the contents of locations in said designated section with said other portion of said digital signals representative of a subject, whereby to identify a specific location in said designated section.

3. A system according to claim 2 further including means to manifest said digital signals representative of a status on operation of said means for retrieving.

4. A system according to claim 3 wherein said means for retrieving includes means for detecting the occurrence of a last location containing digital signals representative of a status in a designated section and further including means to manifest said occurrence.

5. A system according to claim 2 wherein said means for providing a plurality of digital signals representative of a subject includes manual coding means for encoding characters as signals representative of hexadecimal digits.